Figures 1, 2:
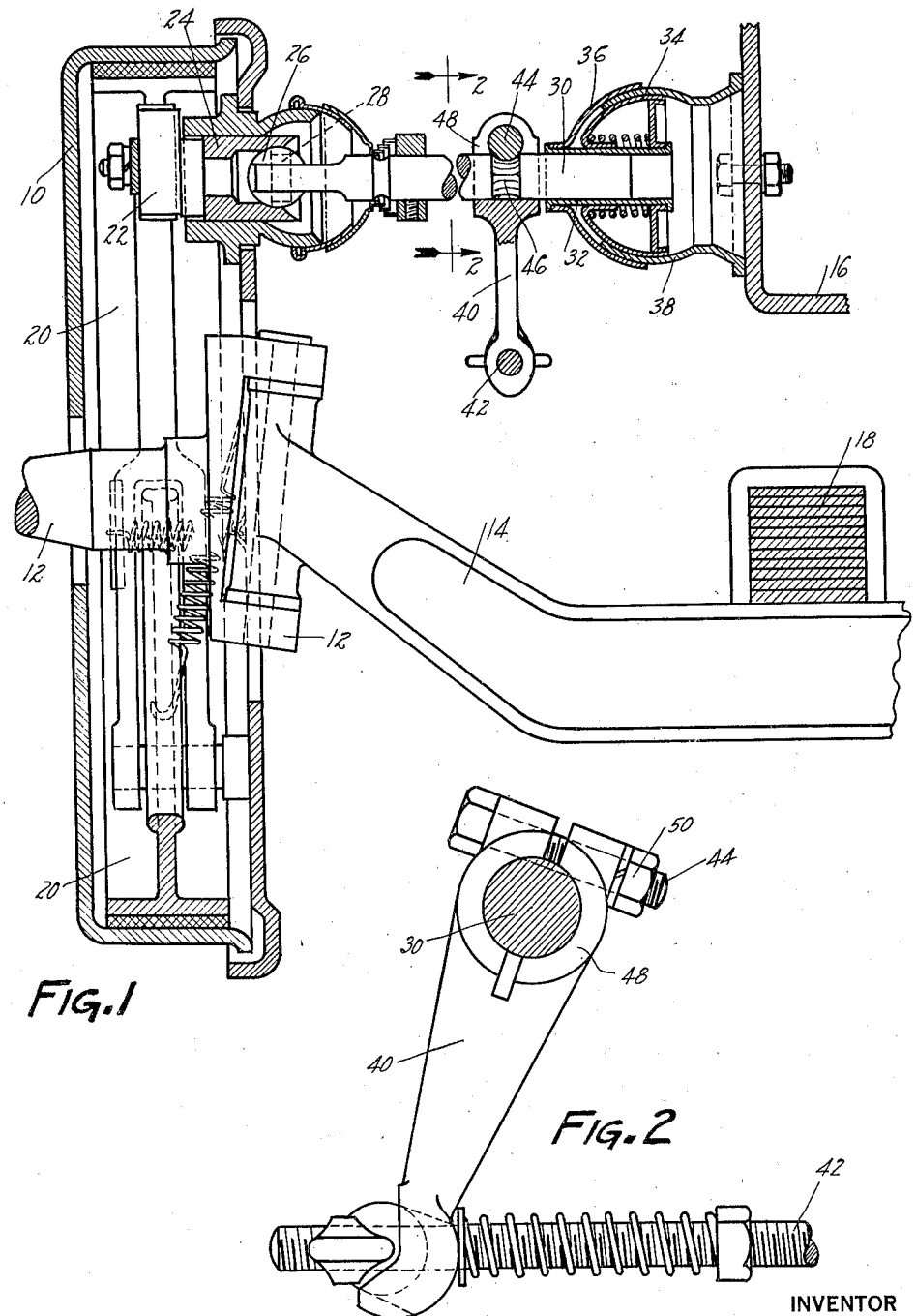

March 8, 1927.

J. R. CAUTLEY 1,619,810

OPERATING MECHANISM

Filed Oct. 12, 1925

INVENTOR
JOHN R CAUTLEY
BY
ATTORNEY

Patented Mar. 8, 1927.

1,619,810

UNITED STATES PATENT OFFICE.

JOHN R. CAUTLEY, OF SOUTH BEND, INDIANA, ASSIGNOR TO BENDIX BRAKE COMPANY, OF CHICAGO, ILLINOIS, A CORPORATION OF ILLINOIS.

OPERATING MECHANISM.

Application filed October 12, 1925. Serial No. 62,077.

This invention relates to the adjustment of operating mechanism such as is used in applying brakes, and is illustrated as embodied in adjustable mechanism for applying a front wheel brake.

In one desirable arrangement a lever pivoted on an operating shaft carries a gear part meshing with gear teeth carried by, and shown integral with, the shaft, and the gear part can therefore be operated to adjust the lever angularly with respect to the shaft. I prefer that the gear part should have a worm thread meshing with worm teeth on the shaft.

According to an important feature of the invention, the lever is clamped to the shaft to preserve its adjustment, by means co operatively engaging the adjusting means. In one simple and efficient embodiment, the gear part bridges a split in the hub of the lever, and means such as a nut threaded on the gear part is provided to contract the hub onto the shaft.

While not necessarily limited to such use, it will be seen that the described arrangement is of especial utility in adjusting front wheel brakes, where the change in the positions of the various parts as the brake wears may have a serious and undesirable effect on the operation of the brake. By the new arrangement, most of the parts of the brake-operating connections are unaffected by the adjustment.

The above and other objects and features of the invention, including various novel combinations of parts and desirable particular constructions, will be apparent from the following description of one illustrative embodiment shown in the accompanying drawing, in which:

Fig. 1 is a vertical transverse section through one front brake and associated parts; and Fig. 2 is a section on the line 2—2 of Fig. 1, showing the brake-operating lever in side elevation.

In the arrangement illustrated, the brake includes a drum 10 turning with the wheel (not shown), the wheel being rotatably mounted on the spindle of a knuckle 12. Knuckle 12 is swivelled, by a king-pin or the like, to one end of the front axle 14 which, with the rear axle, supports a chassis frame 16 by means of springs 18. The brake includes also friction means acting on the drum, and illustrated as internal shoes 20 expanded against the drum by a double cam 22 or some equivalent device.

Cam 22 is keyed or fixed on a hollow shaft 24 having a cylindrical cross bore in its end for outwardly-cylindrical connectors 26, between which a pin 28 swivels the flattened end of the brake-operating shaft 30. Connectors 26 and pin 28 constitute a universal joint substantially in the swivelling axis of the wheel. At its inner end, shaft 30 is slidably received in a sleeve 32 carried by inner and outer semispherical shells 34 and 36 slidably engaging a spherical body portion of a support 38 bolted to the chassis frame 16.

Shaft 30 is rocked to apply the brake by a lever 40 operated from the pedal or its equivalent by a brake rod or the like 42. According to an important feature of the invention, lever 40 carries a gear part 44, preferably a worm, meshing with gear teeth carried by shaft 30, and shown as worm gear teeth 46 formed integrally on a section of the shaft and meshing with the worm thread on part 44. Thus by turning part 44 with a suitable wrench, lever 40 can be adjusted angularly of shaft 30.

I prefer that lever 40 should have a split hub 48 embracing the gear section 46, the split in the hub being bridged by part 44. This makes it possible to contract the hub to clamp the lever on the shaft to preserve the adjustment, by means such as a nut 50 threaded on the worm thread of part 44. When so clamped, the friction between the hub and shaft is so great that there is practically no shearing strain on the threads of the worm.

While one illustrative embodiment of the invention has been described in detail, it is not my intention to limit its scope to that particular embodiment, or otherwise than by the terms of the appended claims.

I claim:

1. Operating mechanism comprising, in combination, a shaft having a part formed with gear teeth, a hub encircling said part and having a lever extending rigidly therefrom on one side and split on the side opposite the lever, and an adjusting member bridging the split in the hub and formed to mesh with said gear teeth and operable to adjust the lever and shaft angularly with respect to each other.

2. Operating mechanism comprising, in combination, a shaft having a part formed with gear teeth, a hub encircling said part and having a lever extending rigidly therefrom on one side and split on the side opposite the lever, an adjusting member bridging the split in the hub and formed to mesh with said gear teeth and operable to adjust the lever and shaft angularly with respect to each other, and means engaging the adjusting member and operable to contract the split hub to clamp the lever on the shaft in adjusted position.

3. Operating mechanism comprising, in combination, a shaft, a hub encircling said part and having a lever extending rigidly therefrom on one side and split on the side opposite the lever, and an adjusting member bridging the split in the hub and formed to be operatively interengaged with the shaft and operable to adjust the lever and shaft angularly with respect to each other.

4. Operating mechanism comprising, in combination, a shaft, a hub encircling said part and having a lever extending rigidly therefrom on one side and split on the side opposite the lever, an adjusting member bridging the split in the hub and formed to be operatively interengaged with the shaft and operable to adjust the lever and shaft angularly with respect to each other, and means engaging the adjusting member and operable to contract the split hub to clamp the lever on the shaft in adjusted position.

5. Operating mechanism comprising, in combination, a shaft having a part formed with worm teeth, a hub encircling said part and having a lever extending rigidly therefrom on one side and split on the side opposite the lever, an adjusting member carried by said hub and bridging the split in the hub and having worm gear teeth meshing with said worm teeth, and means engaging said member and operable in cooperation therewith to contract the split hub about the shaft to clamp the lever to the shaft in any position of angular adjustment.

6. Operating mechanism comprising, in combination, a shaft having a part formed with worm teeth, a hub encircling said part and having a lever extending rigidly therefrom on one side and split on the side opposite the lever, an adjusting bolt carried by said hub and bridging the split in the hub and having a thread forming worm gear teeth meshing with said worm teeth, and means engaging said member and operable in cooperation therewith to contract the split hub about the shaft to clamp the lever to the shaft in any position of angular adjustment.

7. Operating mechanism comprising, in combination, a shaft having a part formed with worm teeth, a hub encircling said part and having a lever extending rigidly therefrom on one side and split on the side opposite the lever, an adjusting bolt carried by said hub and bridging the split in the hub and having a thread forming worm gear teeth meshing with said worm teeth, and a nut threaded on the end of the bolt and operable to tighten up on the bolt to contract said split hub to clamp the lever to the shaft in any position of adjustment.

In testimony whereof, I have hereunto signed my name.

JOHN R. CAUTLEY.